United States Patent [19]

Hornung et al.

[11] Patent Number: 5,443,752
[45] Date of Patent: Aug. 22, 1995

[54] SMECTIC LIQUID-CRYSTAL MIXTURE

[75] Inventors: Barbara Hornung, Hasselroth; Dietmar Jungbauer, Weiterstadt; Javier Manero, Frankfurt am Main, all of Germany

[73] Assignee: Hoechst Aktiengesellschaft, Frankfurt am Main, Germany

[21] Appl. No.: 224,325

[22] Filed: Apr. 7, 1994

[30] Foreign Application Priority Data

Apr. 10, 1993 [DE] Germany .................. 43 11 968.9

[51] Int. Cl.$^6$ .................. C09K 19/52; C09K 19/34; G02F 1/13

[52] U.S. Cl. .................. 252/299.01; 252/299.61; 252/299.63; 252/299.64; 252/299.66; 252/299.67; 359/104

[58] Field of Search .................. 252/299.01, 299.61, 252/299.63, 299.64, 299.65, 299.66, 299.67; 359/104

[56] References Cited

U.S. PATENT DOCUMENTS

| | | | |
|---|---|---|---|
| 4,874,542 | 10/1989 | Higuchi et al. | 252/299.61 |
| 4,876,028 | 10/1989 | Hemmerling et al. | 252/299.61 |
| 4,988,459 | 1/1991 | Scherowsky | 252/299.61 |
| 4,988,459 | 1/1991 | Scherowsky et al. | 252/299.01 |
| 5,064,566 | 11/1991 | Hopf et al. | 252/299.61 |
| 5,328,639 | 7/1994 | Müller et al. | 252/299.61 |

FOREIGN PATENT DOCUMENTS

| | | |
|---|---|---|
| 0285395 | 10/1988 | European Pat. Off. . |
| 0351746 | 1/1990 | European Pat. Off. . |
| 0361272 | 4/1990 | European Pat. Off. . |
| 0365820 | 5/1990 | European Pat. Off. . |
| 0292954 | 12/1992 | European Pat. Off. . |
| 0541081 | 5/1993 | European Pat. Off. . |
| 0578054 | 1/1994 | European Pat. Off. . |
| 0603786 | 6/1994 | European Pat. Off. . |
| 4116751 | 11/1992 | Germany . |
| WO92/12974 | 8/1992 | WIPO . |
| WO93/12093 | 7/1993 | WIPO . |

OTHER PUBLICATIONS

Derwent Abstract No. 4116751-A published May 23, 1991.

*Primary Examiner*—Shean Wu
*Attorney, Agent, or Firm*—Curtis, Morris & Safford

[57] ABSTRACT

A smectic liquid-crystal mixture comprising

A. at least one compound of the formula (I)

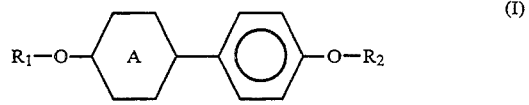

B. at least one compound of the formula (III)

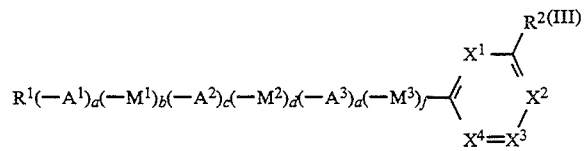

C. compounds of the formula (IV)

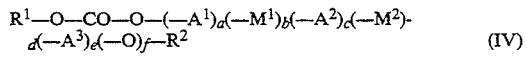

in which:
$R^1$ and $R^2$ are identical or different and are a straight-chain or branched alkyl group having 1 to 22 or 3 to 22 carbon atoms respectively,
$A^1$, $A^2$ and $A^3$ are identical or different and are 1,4-phenylene, where one or two H atoms may also be replaced by F, 2,5-pyrimidinediyl, and further smectogenic compounds and, if desired, dopants. The mixture exhibits a low melting point and a broad $S_c$ phase.

8 Claims, No Drawings

SMECTIC LIQUID-CRYSTAL MIXTURE

BACKGROUND OF THE INVENTION

1. Field of the Invention

The invention relates to a smectic, in particular a ferroelectric, liquid-crystal mixture based on phenylpyrimidine derivatives.

2. Description of the Prior Art

Liquid crystals (LCs), because of the unusual combination of anisotropic and fluid behavior, have a large number of possible uses in electrooptical switching and display devices.

In addition to nematic liquid-crystal phases, which have been employed for a long time, in recent times there has been increased use of smectic liquid-crystal phases too, in particular those which are ferroelectric (FLCs).

The practical use of ferroelectric liquid crystals in electrooptical switching and display elements requires chiral, tilted smectic phases such as $S_c^*$ phases (see e.g. R. B. Meyer, L. Liebert, L. Strzelecki and P. Keller, J. Physique 36 (1975) L-69), which are stable over a broad temperature range. This aim can be achieved by using compounds which form such phases themselves or else by doping compounds which do not form chiral, tilted smectic phases with optically active compounds (see e.g. M. Brunet, Cl. Williams, Ann. Phys. 3 (1978) 237).

Switching and display devices containing ferroelectric liquid-crystal mixtures (FLC light valves) are disclosed, for example, in EP-A 0 032 362 (=U.S. Pat. No. 4,367,924). LC light valves are devices which modify their optical transmission properties, for example on the basis of electrical switchings, in such a way that light which is incident—and possibly reflected again—is intensity-modulated. Examples are the known watch and calculator displays or LC displays in the office communications and television sectors. However, they also include light shutters, as are employed, for example, in photocopiers and printers. So-called "spatial light modulators" are also areas of application for LC light valves (see Liquid Crystal Device Handbook, Nikkan Kogyo Shimbun, Tokyo, 1989; ISBN 4-526-02590-9C 3054 and papers cited therein).

The electrooptical switching and display devices under discussion are generally constructed in such a way that the FLC layer is enclosed on both sides by layers which are usually, in this sequence starting from the FLC layer at least one alignment layer, electrodes and a limiting plate (for example made of glass). In addition, they contain a polarizer if they are operated in "guest-host" mode or in reflective mode, or two polarizers if the transmissive birefringence mode is used. The switching and display elements may, if desired, contain further auxiliary layers, such as diffusion barrier or insulation layers.

The abovementioned alignment layers are conventionally rubbed films comprising organic polymers or obliquely vapor-deposited silicon oxide, and vary from display manufacturer to display manufacturer.

When the distance between the limiting plates is sufficiently small, the alignment layers bring the FLC molecules into a configuration in which the molecules lie with their long axes parallel to one another and the smectic planes arranged perpendicular or inclined to the alignment layer. In this arrangement the molecules have two equivalent alignments between which they can be switched by applying an electrical field in a pulsed manner.

In order to achieve a uniform planar alignment in the $S_c^*$ phase over the entire display, it is advantageous if the phase sequence of the liquid-crystal mixture with decreasing temperature is: isotropic-nematic-smectic A-smectic C (see e.g. K. Flatischler et al., Mol. Cryst. Liq. Cryst. 131 (1985) 21; T. Matsumoto et al., pp. 468–470, Proc. of the 6th Int. Display Research Conf. Japan Display, 30 Sep.–2 Oct. 1986, Tokyo, Japan; M. Murakami et al., ibid. pp. 344–347).

For ferroelectric (chiral smectic) liquid-crystal mixtures, an additional condition which must be fulfilled is that the pitch of the helix in the $S_c^*$ phase is sufficiently large to prevent the formation of a helix in the display, and is sufficiently large in the $N^*$ phase that it is a homogeneous nematic phase and not a twisted state which forms in the display during the cooling process. The formation of a uniform planar alignment in the display is necessary to obtain a high contrast.

Switching the molecules back and forth (and thus the light or dark position in the case of a fixed polarizer setting) is carried out, as already mentioned, by applying an electrical field in a pulsed manner. Because of the bistability of the FLC molecules, voltage must only be applied for one change in alignment. A subdivision of the display into individual pixels is achieved by the known matrix arrangement of the electrodes. As a rule, the electrodes are located on the insides of the carrier plates of the display with the rows on one carrier plate and the columns on the other carrier plate. In the regions of intersection, the pixels B, the liquid crystal located between rows and columns is switched. A comprehensive description of multiplex addressing for FLC displays can be found, for example in Proc. SID 28/2 (1978) 211 and Ferroelectrics 94 (1989) 3. The response times T of the FLC mixture in the display are inversely proportional to the spontaneous polarization $P_s$ and are in the $\mu s$ range.

$$T = \frac{\eta}{P_s \cdot E}$$

E = level of applied electrical field
$\eta$ = rotational viscosity

Another important factor besides the spontaneous polarization is the tilt angle $\theta$, that is the angle between the n director, i.e. the average molecular orientation, and the normal to the layers. Together with the birefringence $\Delta n$ and the layer thickness d, this angle affects the brightness of the display in accordance with the relationship:

$$T = T_o \sin^2 (4\theta) \cdot \sin^2 \left( \frac{\Delta n \cdot d \cdot \pi}{\lambda} \right)$$

where $T_o$ is the intensity and $\lambda$ is the wavelength of the incident light.

Conventionally, given a matrix arrangement of the electrodes in the display, the term columns is applied to those electrodes which are subjected to information-carrying pulses (also called column or data pulses). The rows are then activated by electrical pulses in a stroboscopic sequence, which is the precondition for the transmission of information to the pixels of the rows. An important property of the display is the time required for setting up or changing an image. For many applications it should be as short as possible.

Since the rows are at best sequentially addressed, the critical factor is the duration for which a row must be addressed in order to read in the information. The shorter the voltage pulse required for switching the liquid crystal, the shorter this read-in time is. In general, the maximum voltage to be applied is predetermined by the choice of drivers, so that the pulse width necessary for switching should be as small as possible.

The product of necessary pulse width and voltage (=pulse height) is in good approximation constant, and thus independent of the voltage, so that the precise pulse area required for switching (CPA=critical pulse area) represents a parameter which is a good characteristic of the rapidity of the liquid crystal. The CPA should be as small as possible.

Furthermore, it is advantageous if the LC mixture in the display has a high margin with low flicker (J. Dijon et al., Ferroelectrics 113 (1991) 371). The term margin is understood as the voltage range, with a given driving scheme, in which the pulse height must lie in order that the LC mixture switches fully. The margin is influenced by the so-called bias, i.e. the ratio between the row and data pulse voltage. The margin should be as large as possible in order to compensate fluctuations in thickness and/or temperature in the display. In multiplex addressing, the molecules of nonselected rows are diverted by the data pulses out of their position of rest, and then relax again. The fluctuation in brightness which this causes is termed flicker. Flicker leads to a reduction in contrast. Rieker et al. (Phys. Rev. Lett. 59 (1987) 2658) showed that, when cooling from the isotropic phase through the $S_A$ phase, the $S_c$ phase forms a so-called chevron geometry in displays, i.e. that the layers are angled. Therefore, the effective tilt angle $\theta_{\mathit{eff}}$ must be inserted in the abovementioned relationship between tilt angle and transmission. The effective tilt angle is the angle between the projections of smectic normals and the optical axis of the liquid crystal to the glass surface of the cell.

A display can be operated alternatively in the chevron geometry, which is adopted naturally during the cooling procedure, or in the so-called quasi-bookshelf geometry (QBG), into which the liquid crystal can be brought by specific field treatment (see e.g. H. Rieger et al., SID 91 Digest (Anaheim) 1991, p. 396).

Obtaining good values for the majority of the above-listed parameters is barely possible with individual substances. Consequently, the transition was made many years ago to using mixtures of different substances. Such mixtures generally comprise an achiral basic mixture and optically active dopants.

The achiral basic components are intended to achieve a broad $S_c$ phase situated in a favorable temperature range. In addition, the achiral basic mixture should have the phase sequence I-N-$S_A$-$S_c$ and as low as possible a melting point. The optically active dopants are then used to induce the ferroelectric nature of the mixture, for pitch compensation and for adaptation of the optical and dielectric anisotropy.

It is known that certain derivatives of phenylpyrimidine, especially 5-alkyl-2-(4-alkoxyphenyl)pyrimidines, are able to form $S_c$, $S_A$ and N phases (D. Demus and H. Zaschke, "Flüssigkristalle in Tabellen" [Liquid Crystals in Tables], VEB Deutscher Verlag für Grundstoffindustrie, Leipzig 1974, pp. 260–261) and, in addition, can be converted into FLC mixtures by the addition of optically active dopants (M. L. Blino v et al., Sov. Phys. Usp., 27(7) (1984) 492; L. A. Beresnev et al., Ferroelectrics 59 [321]/1(1984), presented at the 5th Conference of Soc. Countries in Liquid Crystals, Odessa, USSR, Oct. 1983; DE-A 35 15 347, EP-A 0 206 228, EP-A 0 225 195). It is also known that relatively low melting points and a broadening in the desired liquid-crystalline phases can be achieved by mixing a plurality of LC compounds [see e.g. D. Demus et al., Mol. Cryst. Liq. Cryst. 25 (1974) 215; J. W. Goodby, Ferroelectrics 49 (1985) 275], and that the depression of melting point is greater, the greater the structural differences between the components of the mixture (see e.g. J. S. Dave et al., J. Chem. Soc. 1955, 4305).

Despite the successes in the provision of new LC materials which have been achieved by previous mixtures, the development of LC basic mixtures, and especially FLC mixtures, can in no way be regarded as at an end. Furthermore, manufacturers of display elements (displays) are interested in a broad spectrum of various mixtures for the various areas of application.

SUMMARY OF THE INVENTION

The object of the present invention is therefore to provide compositions of suitable components for nonchiral LC basic mixtures, especially for FLC mixtures. These mixtures should fulfill as many as possible of the abovementioned criteria, especially a high contrast, a good alignment, a large margin, low flicker, a large angle in the chevron geometry and a low melting point coupled with as high as possible a temperature of $S_c*/S_A$ phase transition.

It has now been found surprisingly that smectic liquid-crystal mixtures comprising a combination of alkoxyphenylpyrimidines, metasubstituted six-membered ring aromatic compounds and specific mesogenic carbonates have a particularly favorable profile of properties for use in LC phases.

DESCRIPTION OF THE PREFERRED EMBODIMENTS

The invention therefore relates to a smectic liquid-crystal mixture comprising

A. at least one compound of the formula (I)

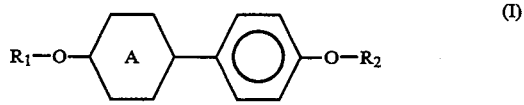

in which:

$R_1$ and $R_2$ are identical or different and are a straight-chain or branched alkyl group having 1 to 18 or 3 to 18 carbon atoms respectively, where a —$CH_2$— group adjacent to the oxygen may also be replaced by —CO,

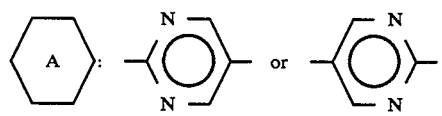

and/or at least one compound of the formula (II)

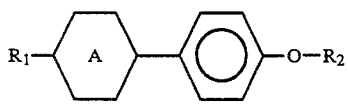 (II)

in which:
R$_1$ and R$_2$ are identical or different and are a branched or unbranched alkyl group having 1 to 18 or 3 to 18 carbon atoms respectively, where a —CH$_2$— group adjacent to the oxygen may also be replaced by —CO—;

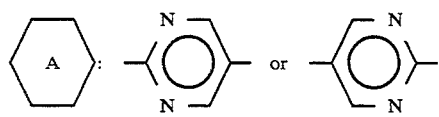

B. at least one compound of the formula (III)

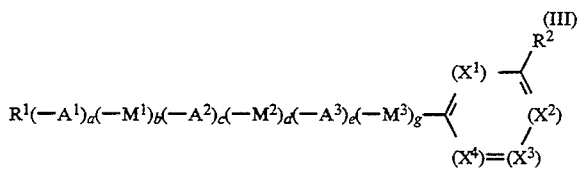 (III)

in which:
R$^1$ and R$^2$ are identical or different and are a straight-chain or branched alkyl radical having 1 to 22 or 3 to 22 carbon atoms respectively, where one or two nonadjacent —CH$_2$— groups may also be replaced by —O—, —CO—, —CO—O—, —O—CO—, —O—CO—O— or —Si(CH$_3$)$_2$—,
A$^1$, A$^2$ and A$^3$ are identical or different and are 1,4-phenylene, where one or two H atoms may be replaced by F, 2,5-pyridinediyl, where one or two H atoms may be replaced by F, 2,5-pyrimidinediyl, where one or two H atoms may be replaced by F, trans-1,4-cyclohexylene, where one or two H atoms may be replaced by —CN and/or —CH$_3$, or 1,3,4-thiadiazole-2,5-diyl,
and A$^1$ is also

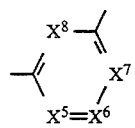

M$^1$, M$^2$ and M$^3$ are identical or different and are —O—, —CO—O—, —O—CO—, —CH$_2$—O—, —O—CH$_2$—, —CH$_2$—CH$_2$—,
X$^1$, X$^2$, X$^3$, X$^4$, X$^5$, X$^6$, X$^7$ and X$^8$ are CH or N, the number of N atoms per six-membered ring being 0, 1 or 2,
a, b, c, d, e and f are zero or one, on condition that the sum of a+c+e is 0, 1, 2 or 3;
C. compounds of the formula (IV)

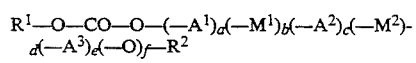 (IV)

in which:

R$^1$ and R$^2$ are identical or different and are a straight-chain or branched alkyl group having 1 to 22 or 3 to 22 carbon atoms respectively,
A$^1$, A$^2$ and A$^3$ are identical or different and are 1,4-phenylene, where one or two H atoms may also be replaced by F, 2,5-pyrimidinediyl, where one or two H atoms may also be replaced by F, or 2,5-pyridinediyl, where one or two H atoms may also be replaced by F,
M$^1$ and M$^2$ are identical or different and are —O—, —CO—, —CO—O—, —O—CO—, —CH$_2$—O—, —O—CH$_2$— or —CH$_2$—CH$_2$—,
a, b, c, d, e and f are zero or one, on condition that the sum a+c+e is 1, 2 or 3;
and at least one compound from groups D to H;
D. silicon compounds of the formula (V)

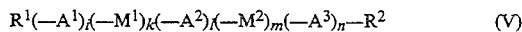 (V)

in which:
R$^1$ is straight-chain or branched alkyl having 1 to 22 or 3 to 22 carbon atoms respectively, where one or two nonadjacent —CH$_2$— groups may also be replaced by —O—, —CO—, —CO—O—, —O—CO— or —O—CO—O—,
R$^2$ is straight-chain or branched alkyl having 1 to 22 or 3 to 22 carbon atoms respectively, where one or two nonadjacent —CH$_2$— groups may also be replaced by —O—, —CO—, —CO—O—, —O—CO— or —O—CO—O—, with the proviso that one —CH$_2$— group not attached to oxygen is replaced by —Si(CH$_3$)$_2$—,
A$^1$, A$^2$ and A$^3$ are identical or different and are 1,4-phenylene, where one or two H atoms may be replaced by F, trans-1,4-cyclohexylene, 2,5-pyridinediyl, where one or two H atoms may be replaced by F, 2,5-pyrimidinediyl, where one or two H atoms in each case may be replaced by F, or 1,3,4-thiadiazole-2,5-diyl,
M$^1$ and M$^2$ are identical or different and are —CO—O—, —O—CO—, —CH$_2$—O— or —O—CH$_2$—,
i, k, l, m and n are zero or one, with the proviso that i+l+n=2 or 3;
E. hydroquinone derivatives of the formula (VI)

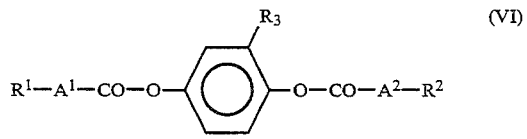 (VI)

in which:
R$^1$ and R$^2$ are identical or different and are a straight-chain or branched alkyl radical having 1 or 3 to 16, preferably 1 or 3 to 10, carbon atoms, respectively, where one or two nonadjacent —CH$_2$— groups may also be replaced by —O—, —CO—, —O—CO—, —CO—O— or —O—CO—O—,
R$^3$ is —CH$_3$, CF$_3$ or —C$_2$H$_5$,
A$^1$ and A$^2$ are identical or different and are

F. pyridylpyrimidines of the formula (VII)

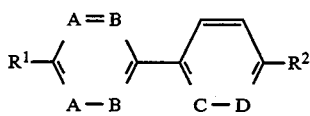

in which:
A is N and B is CH or A is CH and B is N, C is N and D is CH or C is CH and D is N, where one or two CH groups may be replaced by CF groups,
R$^1$ and R$^2$ are identical or different and are a straight-chain or branched alkyl radical having 1 to 22 or 3 to 22 carbon atoms respectively, where one or two nonadjacent —CH$_2$— groups may also be replaced by —O—, —CO—, —CO—O—, —O—CO— or —O—CO—O—;

G. phenylbenzoates of the formula (VIII)

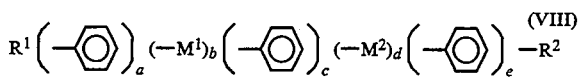

in which:
R$^1$ and R$^2$ are identical or different and are a straight-chain or branched alkyl radical having 1 to 22 or 3 to 22 carbon atoms respectively, where one or two nonadjacent —CH$_2$— groups may also be replaced by —O—, —CO—, —CO—O—, —O—CO— or —O—CO—O—,
M$^1$ and M$^2$ are identical or different and are —CO—O— or —O—CO—,
a, b, c, d and e are zero or one, on condition that a+c+e=2 or 3 and b+d=1 or 2;

H. compounds of the formula (IX)

R$^1$(—A$^1$)$_a$(—M$^1$)$_b$(—A$^2$)$_c$(—M$^2$)$_d$(—A$^3$)$_e$(—M$^3$)- $_f$(—A$^4$)—H            (IX)

in which:
R$^1$ is a straight-chain or branched alkyl radical having 1 to 22 or 3 to 22 carbon atoms respectively, where one or two nonadjacent —CH$_2$— groups may also be replaced by —O—, —CO—, —CO—O—, —O—CO—, —O—CO—O— or —Si(CH$_3$)$_2$—,
A$^1$, A$^2$, A$^3$ and A$^4$ are identical or different and are 1,4-phenylene, where one or two H atoms may be replaced by F or CN, 2,5-pyridinediyl, where one or two H atoms may be replaced by F, 2,5-pyrimidinediyl, where one or two H atoms may be replaced by F, trans-1,4-cyclohexylene, 1,3,4-thiadiazole-2,5-diyl or 2,6-naphthalenediyl,
M$^1$, M$^2$ and M$^3$ are identical or different and are —CO—O—, —O—CO—, —CH$_2$—O—, —O—CH$_2$— or —CH$_2$—CH$_2$—,
a, b, c, d, e and f are zero or one, on condition that the sum a+c+e is 0, 1, 2 or 3.

The liquid-crystal mixtures according to the invention have low melting points, broad S$_c$ phases and a high S$_c$/S$_A$ phase transition. Ferroelectric liquid-crystal mixtures according to the invention exhibit a good alignment, a large margin, low flicker and a large angle in the chevron geometry.

Compounds preferred as component A are those of the formula (I) and/or (II) in which:
R$^1$ and R$^2$ are identical or different and are a straight-chain or branched alkyl group having 1 to 12 or 3 to 12 carbon atoms respectively, where a —CH$_2$— group adjacent to the oxygen may also be replaced by —CO—,

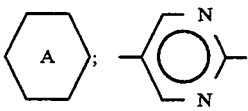

Compounds preferred as component B are those of the formula (III) in which:
R$^1$ and R$^2$ are identical or different and are a straight-chain alkyl radical having 1 to 14 carbon atoms, where one or two nonadjacent —CH$_2$— groups may also be replaced by —O—, —CO—, —CO—O—, —O—CO—, —O—CO—O— or —Si(CH$_3$)$_2$—,
A$^1$, A$^2$ and A$^3$ are identical or different and are 1,4-phenylene, 2,5-pyrimidinediyl, where one or two H atoms may also be replaced by F, trans-1,4-cyclohexylene or 1,3,4-thiadiazole-2,5-diyl.

Compounds preferred as component C are those of the formula (IV) in which:
R$^1$ and R$^2$ are identical or different and are a straight-chain alkyl radical having 1 to 14 carbon atoms, where one or two nonadjacent —CH$_2$— groups may also be replaced by —O—, —CO—, —CO—O—, —O—CO—, —O—CO—O— or —Si(CH$_3$)$_2$—,
A$^1$, A$^2$ and A$^3$ are identical or different and are 1,4-phenylene, 2,5-pyrimidinediyl, where one or two H atoms may also be replaced by F, trans-1,4-cyclohexylene or 1,3,4-thiadiazole-2,5-diyl.

Preferred compounds from group D are those of the formula (V) in which:
R$^1$ is a straight-chain or branched alkyl group having 1 to 12 or 3 to 12 carbon atoms respectively, where one or two nonadjacent —CH$_2$— groups may also be replaced by —O—, —CO—O— or —O—CO—,
R$^2$ is a straight-chain or branched alkyl group having 1 to 12 or 3 to 12 carbon atoms respectively, where one or two nonadjacent —CH$_2$— groups may also be replaced by —O—, —CO—O— or —O—CO—, where a —CH$_2$— group which is not attached to oxygen is replaced by —Si(CH$_3$)$_2$—.

Preferred compounds from group E are those of the formula (VI) in which:
R$^1$ and R$^2$ are identical or different and are a straight-chain or branched alkyl group having 1 to 10 or 3 to 10 carbon atoms respectively, where a —CH$_2$— group may also be replaced by —O—, —CO—O—, —O—CO— or —O—CO—O—,
R$^3$ is CH$_3$ or CF$_3$.

Preferred compounds from group F are those of the formula (VII) in which:
R$^1$ and R$^2$ are identical or different and are a straight-chain or branched alkyl group having 1 to 14 or 3 to 14 carbon atoms respectively, where one or two nonadjacent —CH$_2$— groups may also be replaced by —O—, —CO—, —CO—O—, —O—CO— or —O—CO—O—.

Preferred compounds from group G are those of the formula (VIII) where:
R$^1$ and R$^2$ are identical or different and are a straight-chain alkyl radical having 1 to 14 carbon atoms, where one or two nonadjacent —CH$_2$— groups may also be replaced by —O—, —CO—, —CO—O—, —O—CO— or —O—CO—O—.

Preferred compounds from group H are those of the formula (IX) in which:

$R^1$ is a straight-chain alkyl radical having 1 to 14 carbon atoms, where one or two nonadjacent —CH$_2$— groups may also be replaced by —O—, —CO—, —CO—O—, —O—CO—, —O—CO—O— or —Si(CH$_3$)$_2$—, $A^1$, $A^2$, $A^3$ and $A^4$ are identical or different and are 1,4-phenylene, 2,5-pyrimidinediyl, where one or two H atoms may also be replaced by F, trans-1,4-cyclohexylene or 1,3,4-thiadiazole-2,5-diyl.

The invention also relates to a ferroelectric liquid-crystal mixture comprising a) at least one compound from each of groups A, B and C;
b) at least one compound from groups D to H;
c) at least two compounds from groups I to M;
d) at least one compound from group N:

I. optically active phenylbenzoates of the formula (X)

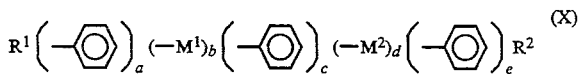

in which:

$R^1$ and $R^2$ are identical or different and are a straight-chain or branched alkyl radical having 1 to 22 or 3 to 22 carbon atoms respectively, where one or two nonadjacent —CH$_2$— groups may also be replaced by —O—, —CO—, —CO—O—, —O—CO— or —O—CO—O—, and in which at least one of the radicals $R^1$ and $R^2$ is a branched, optically active alkyl group, $M^1$ and $M^2$ are identical or different and are —CO—O—, —O—CO— or a single bond, a, b, c, d and e are zero or one, on condition that a+c+e is 2 or 3 and b+d is 1 or 2;

J. optically active: oxirane ethers of the formula (XI)

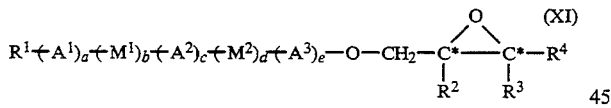

in which the symbols and indices have the following meanings:

* is a center of chirality, $R^1$ is a straight-chain or branched alkyl radical having 1 to 22 or 3 to 22 carbon atoms respectively, where one or two nonadjacent —CH$_2$— groups may also be replaced by —O—, —CO—, —CO—O—, —O—CO—, —O—CO—O— or —Si(CH$_3$)$_2$—, or the optically active group below,

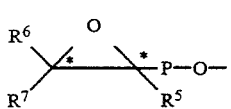

$R^2$, $R^3$, $R^4$, $R^5$, $R^6$ and $R^7$ are identical or different and are H or a straight-chain or branched alkyl radical having 1 to 16 or 3 to 16 carbon atoms respectively, P is —CH$_2$— or —CO—, $A^1$, $A^2$ and $A^3$ are identical or different and are 1,4-phenylene, where one or two H atoms may be replaced by F, 2,5-pyridinediyl, where one or two H atoms in each case may be replaced by F, 2,5-pyrimidinediyl, where one or two H atoms may be replaced by F, trans-1,4-cyclohexylene, where one or two H atoms may be replaced by —CN and/or —CH$_3$, or 1,3,4-thiadiazole-2,5-diyl, $M^1$ and $M^2$ are identical or different and are —CO—O—, —O—CO—, —CH$_2$—O—, —O—CH$_2$— or —CH$_2$—CH$_2$—, a, b, c, d and e are zero or one;

K. optically active oxirane esters of the formula (XII)

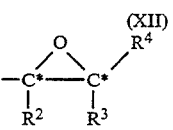

in which the symbols and indices have the following meanings:

* is a center of chirality, $R^1$ is a straight-chain or branched alkyl radical having 1 to 22 or 3 to 22 carbon atoms respectively, where one or two nonadjacent —CH$_2$— groups may also be replaced by —O—, —CO—, —CO—O—, —O—CO—, —O—CO—O— or —Si(CH$_3$)$_2$—, $R^2$, $R^3$ and $R^4$ are identical or different and are H or a straight-chain or branched alkyl radical having 1 to 16 carbon atoms, $A^1$, $A^2$ and $A^3$ are identical or different and are 1,4-phenylene, where one or two H atoms may be replaced by F, 2,5-pyridinediyl, where one or two H atoms may be replaced by F, 2,5-pyrimidinediyl, where one or two H atoms may be replaced by F, trans-1,4-cyclohexylene, where one or two H atoms may be replaced by —CN and/or —CH$_3$, or 1,3,4-thiadiazole-2,5-diyl, $M^1$ and $M^2$ are identical or different and are —CO—O—, —O—CO—, —CH$_2$—O—, —O—CH$_2$— or —CH$_2$—CH$_2$—, a, b, c, d and e are zero or one;

L. optically active dioxolane ethers of the formula (XIII)

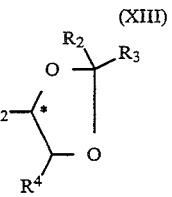

in which the symbols and indices have the following meanings:

* is a center of chirality, $R^1$ is a straight-chain or branched alkyl radical having 1 to 22 or 3 to 22 carbon atoms respectively, where one or two nonadjacent —CH$_2$— groups may also be replaced by —O—, —CO—, —CO—O—, —O—CO—, —O—CO—O— or —Si(CH$_3$)$_2$—, $R^2$, $R^3$ and $R^4$ are identical or different and are H or a straight-chain or branched alkyl radical having 1 to 16 carbon atoms, where $R^2$ and $R^3$ together may also be —(CH$_2$)$_5$—, $A^1$, $A^2$ and $A^3$ are identical or different and are 1,4-phenylene, where one or two H atoms may be replaced by F, 2,5-pyridinediyl, where one or two H atoms may be replaced by F, 2,5-pyrimidinediyl, where one or two H atoms may be replaced by F, trans-1,4-cyclohexylene, in which one or two H atoms may be replaced by —CN and/or —CH$_3$, or 1,3,4-thiadiazole-2,5-diyl, $M^1$ and $M^2$ are identical or different and are —CO—O—, —O—CO—, —CH$_2$—O—, —O—CH$_2$— or —CH$_2$—CH$_2$—, a, b, c, d and e are zero or one;

M. optically active dioxolane esters of the formula (XIV)

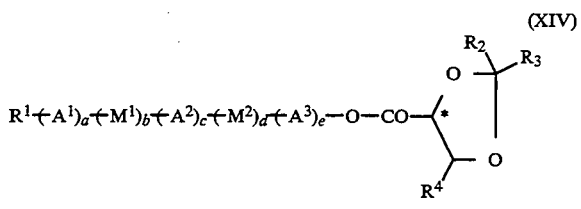

in which:

$R^1$ is a straight-chain or branched alkyl radical having 1 to 16 carbon atoms, where one or more nonadjacent: —CH$_2$— groups may be replaced by —O—, —CO—, —O—CO— or CO—O—, $R^2$, $R^3$ and $R^4$ are identical or different and are H or a straight-chain alkyl radical having 1 to 16 carbon atoms, where $R^2$ and $R^3$ together may also be —(CH$_2$)$_5$—, $A^1$, $A^2$ and $A^3$ are identical or different and are 1,4-phenylene, where one or two H atoms may be replaced by F, 2,5-pyridinediyl, where one or two H atoms may be replaced by F, 2,5-pyrimidinediyl, where one or two H atoms may be replaced by F, trans-1,4-cyclohexylene, where one or two H atoms may be replaced by —CN and/or —CH$_3$, or 1,3,4-thiadiazole-2,5-diyl, $M^1$ and $M^2$ are identical or different and are —CO—O—, —O—CO—, —CH$_2$—O—, —O—CH$_2$— or —CH$_2$—CH$_2$—, a, b, c, d and e are zero or one;

N. macrocyclic compounds of the formula (XV)

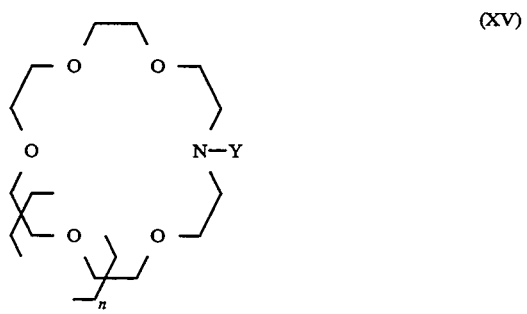

where n is 0 or 1 and

Y is —CO—(t-butyl) or —CO—(adamantyl).

All asymmetric carbon atoms in the optically active compounds from groups I to M may give rise, identically or differently, to (R) or (S) configurations.

It has been shown that the mixtures according to the invention satisfy the abovementioned requirements of FLC mixtures particularly well, and in particular they exhibit short response times, a particularly high margin and very good capacity for alignment. The mixtures cannot only be operated very well in chevron geometry but are also, in addition, suitable for a field treatment, i.e. for operation in the quasi-bookshelf geometry (QBG).

Preferred compounds from group I are those of the formula (X) in which:

$R^1$ and $R^2$ are identical or different and are a straight-chain or branched alkyl radical having 1 to 16 or 3 to 16 carbon atoms respectively, where a —CH$_2$— group may also be replaced by —O—, —CO—O— or —O—CO—, and in which at least one of the radicals $R^1$ and $R^2$ is a branched, optically active alkyl group.

Preferred compounds from group J are those of the formula (XI) in which:

$R^1$ is a straight-chain alkyl radical having 1 to 14 carbon atoms, where one or two nonadjacent —CH$_2$— groups may also be replaced by —O—, —CO—, —CO—O—, —O—CO—, —O—CO—O— or —Si(CH$_3$)$_2$—, or is the chiral group

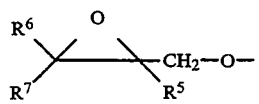

$R^2=R^5$, $R^3=R^6$ and $R^4=R^7$ and are identical or different straight-chain alkyl radicals having 1 to 6 carbon atoms, $A^1$, $A^2$ and $A^3$ are identical or different and are 1,4-phenylene, 2,5-pyrimidinediyl, where one or two H atoms may be replaced by F, trans-1,4-cyclohexylene or 1,3,4-thiadiazole-2,5-diyl.

Preferred compounds from group K are those of the formula (XII) in which:

$R^1$ is a straight-chain alkyl radical having 1 to 14 carbon atoms, where one or two nonadjacent —CH$_2$— groups may also be replaced by —O—, —CO—, —CO—O—, —O—CO—, —O—CO—O— or —Si(CH$_3$)$_2$—, $R^2$, $R^3$ and $R^4$ are identical or different and are H or a straight-chain alkyl radical having 1 to 6 carbon atoms, $A^1$, $A^2$ and $A^3$ are identical or different and are 1,4-phenylene, 2,5-pyrimidinediyl where one or two H atoms may be replaced by F, trans-1,4-cyclohexylene or 1,3,4-thiadiazole-2,5-diyl.

Preferred compounds from group L are those of the formula (XIII) in which:

$R^1$ is a straight-chain alkyl radical having 1 to 14 carbon atoms, where one or two nonadjacent —CH$_2$— groups may be replaced by —O—, —CO—, —CO—O—, —O—CO—, —O—CO—O— or —Si(CH$_3$)$_2$—, $R^2$ and $R^3$ are CH$_3$ or together are —(CH$_2$)$_5$—, $R^4$ is H, $A^1$, $A^2$ and $A^3$ are identical or different and are 1,4-phenylene, 2,5-pyrimidinediyl, where one or two H atoms may be replaced by F, trans-1,4-cyclohexylene or 1,3,4-thiadiazole-2,5-diyl.

Preferred compounds from group M are those of the formula (XIV) in which:

$R^1$ is a straight-chain alkyl radical having 1 to 14 carbon atoms, where one —CH$_2$— group may also be replaced by —O—, —CO—O—, —O—CO— or —O—CO—O—, $R^2$ and $R^3$ are CH$_3$ or together are —(CH$_2$)$_5$—, $R^4$ is H, $A^1$, $A^2$ and $A^3$ are identical or different and are 1,4-phenylene, 2,5-pyrimidinediyl, where one or two H atoms may be replaced by F, trans-1,4-cyclohexylene or 1,3,4-thiadiazole-2,5-diyl.

Achiral base mixtures according to the invention are preferred which comprise, in addition to components A, B and C, from 3 to 5 of components D to H, and very particularly preferably from 4 to 5 of components D to H. Of particular preference are the component combinations:

aa) A+B+C+E
ab) A+B+C+D+E
ac) A+B+C+D+E+F
ad) A+B+C+D+E+F+G
ae) A+B+C+D+E+F+G+H.

The ferroelectric liquid-crystal mixtures according to the invention comprise, in addition to components A, B and C, at least one of components D to H and component N, and preferably three of more of components I to M.

Of particular preference are the combinations:
ba) N+J
bb) N+I+J+K+L+M
bc) N+J+K+L
bd) N+J+K+L+M
be) N+J+K+M.

The mixtures according to the invention preferably contain the following amounts by weight of the components indicated:

[The percentages are in each case by weight, based on the weight of the overall mixture]

A: From 10 to 70%, preferably from 15 to 60%, especially from 20 to 50%;
B: From 2 to 30%, preferably from 2 to 20%, especially from 5 to 10%;
C: From 1 to 30%, preferably from 2 to 20%, especially from 5 to 15%;
D: From 0 to 30%, preferably from 1 to 25%, especially from 5 to 20%;
E: From 0 to 15%, preferably from 1 to 10%, especially from 2 to 5%;
F: From 0 to 15%, preferably from 1 to 10%, especially from 2 to 5%;
G: From 0 to 30%, preferably from 1 to 25%, especially from 2 to 20%;
H: From 0 to 30%, preferably from 1 to 20%, especially from 5 to 20%;
I: From 0 to 15%, preferably from 0 to 10%, especially from 1 to 5%;
J: From 0 to 20%, preferably from 1 to 20%, especially from 1 to 15%;
K: From 0 to 20%, preferably from 1 to 20%, especially from 1 to 15%;
L: From 0 to 20%, preferably from 0.1 to 15%, especially from 1 to 10%;
M: From 0 to 20%, preferably from 1 to 15%, especially from 1 to 10%;
N: From 0 to 5%, preferably from 0.1 to 3%, especially from 0.5 to 1.5%.

The mixtures according to the invention contain preferably from 3 to 30 individual compounds (from 5 to 30 for ferroelectric mixtures), particularly preferably from 5 to 25, very particularly preferably from 7 to 22 and especially from 10 to 20 individual compounds. Of the components, it is preferred to employ the following number of individual compounds:

A: 1–10 individual compounds, particularly preferably 4–7 individual compounds;
B: 1–5 individual compounds, particularly preferably 1–3 individual compounds;
C: 1–5 individual compounds, particularly preferably 1–3 individual compounds;
D: 0–5 individual compounds, particularly preferably 1–3 individual compounds;
E: 0–3 individual compounds, particularly preferably 1–2 individual compounds;
F: 0–3 individual compounds, particularly preferably 1–2 individual compounds;
G: 0–3 individual compounds, particularly preferably 1–2 individual compounds;
H: 0–5 individual compounds, particularly preferably 1–3 individual compounds;
I: 0–2 individual compounds, particularly preferably 0–1 individual compounds;
J: 0–3 individual compounds, particularly preferably 1–2 individual compounds;
K: 0–3 individual compounds, particularly preferably 1–2 individual compounds;
L: 0–3 individual compounds, particularly preferably 0–1 individual compounds;
M: 0–3 individual compounds, particularly preferably 0–1 individual compounds;
N: 0–3 individual compounds, particularly preferably 1 individual compound.

In addition to components A to N, the mixtures according to the invention may also, if desired, contain auxiliaries such as viscosity reducers.

The individual components of the mixtures according to the invention are known per se. Along with their preparation they are described, for example, in:

A: WO-A 86/06401
B: EP-A 0 578 054
C: U.S. Pat. No. 4,874,542
D: EP-A 0 355 008
E: DE-A 4 243 705
F: WO-A 92/12974
G: P. Keller, Ferroelectrics 58 (1984) 3; J. /W. Goodby et al., Liquid Crystals and Ordered Fluids, vol. 4, New York 1984
H: DE-A 4 136 627
I: P. Keller, Ferroelectrics 58 (1984) 3; J. W. Goodby et al., Liquid Crystals and Ordered Fluids, vol. 4, New York 1984
J: EP-A 0 263 437 ( U.S. Pat. No. 4,876,028), DE-A 4 143 139
K: EP-A 0 292 954 ( U.S. Pat. No. 4,988,459)
L: EP-A 0 351 746
M: EP-A 0 361 272
N: EP-A 0 528 415.

In order to prepare the mixtures according to the invention, the individual substances are, for example, stirred in the isotropic phase and freed from suspended and other particles via appropriate filters.

The mixtures according to the invention are suitable for use in all sectors of optical technology, for example in switching and display elements, light valves, and components with NLO properties. The mixtures according to the invention are particularly suitable for use wherever the properties of smectic liquid crystals are utilized. However, since the mixtures generally also form nematic phases, they may in principle be used in the field of nematics technology. Achiral base mixtures can be used in all areas of application where anisotropic fluids are used, for example as the column material in gas chromatography.

Ferroelectric mixtures according to the invention are preferably used in the FLC cells described at the outset, which are based on the utilization of the SSFLC effect (see e.g. J. W. Goodby et al., Ferroelectric Liquid Crystals, p. 24 ff., Gordon & Breach, Philadelphia 1991). In cells of this type the compounds according to the invention are preferably employed in combinations with alignment layers, as proposed, for example, in DE-A 42 12 893 or in the German Patent Application with the title "Cyclische Strukturelemente enthaltende Silan-Koppler als Orientierungsschichten [Silane couplers, containing cyclic structural elements, as alignment layers]". The latter document describes an alignment film for liquid crystals which comprises a quasi-monomolecular layer of compounds of the formula $$C_y\text{—}S_p\text{—}A_n$$

in which:

$C_y$ is a medio- or macrocyclic carbon ring having 8 or more ring members, where this ring may also have fused-on benzene rings and may contain —O—, —N—, —S—, —Si— and —B— as heteroatoms, $S_p$ is an alkyl group having 1 to 20 carbon atoms, where one or more nonadjacent —CH$_2$— groups may be replaced by —O—, —S—, —CO—, —O—CO—, —NH—CO—, —O—COO—, —NH—CO—NH—, —NH—CO—O—, —SO$_2$—, —Si(CH$_3$)$_2$—, —CH=CH— or —C≡C—, $A_n$ is $SiX^1X^2X^3$, where
$X^1$ is a single bond and
$X^2$ and $X^3$ are identical or different and are a single bond, an alkyl group or an alkoxy group,
the compound being attached to an oxygen-containing layer by the single bond(s) of the group $A_n$.

The mixtures are also suitable for field treatment (i.e. for operation in the quasi-bookshelf geometry (QBG)) (see e.g. H. Rieger et al., SID 91 Digest (Anaheim) 1991, p. 396).

The mixtures according to the invention are also suitable for use in ferroelectric liquid-crystal displays which are based on the utilization of the DHF effect or the PSFLCD effect (pitch-stabilized ferroelectric liquid crystal display, also called SBF=short pitch bistable ferroelectric effect). The DHF effect is described, for example, by B. I. Ostrovski in Advances in Liquid Crystal Research and Applications, Oxford/Budapest, 1980, 469 ff., and the PSFLCD effect is described, for example, in DE-A 3 920 625 and EP-A 0 405 346. In order to utilize this effect, conversely to the SSFLC effect, a liquid-crystalline material having a short $S_c$ pitch is required.

The invention is illustrated in more detail by the examples:

Examples

To determine the electrooptical properties of the mixtures, self-assembled 1 pixel test cells with alignment layers as described above are used. The layer thickness of the liquid crystal varies between 1.5 and 2 μm. The cells are filled by capillary forces in the isotropic phase, with or without a vacuum. The CPA measurements are carried out with the electrical driving scheme presented in SPIE 1665, Liquid Crystal Materials, Devices and Applications (1992), with a bias B=4:1. The margin measurements were made using the driving scheme presented in the same reference, with a bias B=4:1, the percentage margin given relating to the threshold voltage which was measured with the same scheme.

Example 1

| a mixture consisting of: | proportion by weight |
| --- | --- |
| $C_7H_{15}$—O—[pyrimidine]—[phenyl]—O—$C_9H_{19}$ | 6.29% |
| $C_6H_{13}$—O—[pyrimidine]—[phenyl]—O—$C_8H_{17}$ | 7.11% |
| $C_8H_{17}$—[pyrimidine]—[phenyl]—O—$C_{10}H_{21}$ | 6.87% |
| $C_6H_{13}$—O—[pyrimidine]—[phenyl]—O—$C_6H_{13}$ | 4.94% |
| $C_8H_{17}$—O—[pyrimidine]—[phenyl]—O—$C_6H_{13}$ | 7.11% |
| $C_{10}H_{21}$—O—[phenyl]—CO—O—[phenyl]—O—(CH$_2$)$_3$—CH(CH$_3$)(C$_2$H$_5$) | 8.66% |

-continued

| a mixture consisting of: | proportion by weight |
|---|---|
| C₆H₁₃—O—⟨⟩—CO—O—⟨⟩(CH₃)—O—CO—⟨⟩—O—C₆H₁₃ | 2.46% |
| H—⟨cyclohexyl⟩—⟨⟩—CO—O—⟨pyrimidine⟩—⟨⟩—O—C₈H₁₇ | 5.61% |
| C₃H₇—O—⟨⟩—⟨pyrimidine⟩—⟨⟩—O—C₈H₁₇ | 6.77% |
| C₈H₁₇—O—⟨pyrimidine⟩—⟨pyridine⟩—O—C₈H₁₇ | 3.83% |
| C₈H₁₇—O—CO—O—⟨pyrimidine⟩—⟨⟩—O—C₈H₁₇ | 6.33% |
| C₁₀H₂₁—O—⟨⟩—⟨thiadiazole⟩—⟨⟩ | 6.38% |
| C₈H₁₇—O—⟨pyrimidine⟩—⟨⟩—O—C₈H₁₇ | 7.63% |
| C₄H₉—Si(CH₃)₂—C₄H₈—O—⟨F-pyridine⟩—⟨⟩—⟨cyclohexyl-H⟩—C₅H₁₁ | 7.09% |
| C₄H₉—*⟨S,S-oxirane⟩*—CH₂—O—⟨pyrimidine⟩—⟨⟩—O—CH₂—*⟨S,S-oxirane⟩*—C₄H₉  trans | 2.92% |
| C₆H₁₃—O—⟨⟩—⟨pyrimidine⟩—⟨⟩—O—CO—*⟨R,R-oxirane⟩*—C₃H₇ | 7.16% |
| C₈H₁₇—O—⟨pyrimidine⟩—⟨⟩—O—CH₂—*⟨dioxolane-cyclohexyl spiro⟩ (S) | 2.14% |

| a mixture consisting of: | proportion by weight |
|---|---|
| 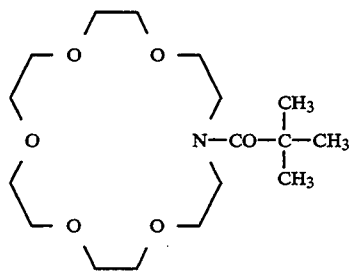 | 0.70% | exhibits the following liquid-crystalline phase ranges:

X—35 $S_c^*$ 71 $S_A$ 86 N* 91 I

The spontaneous polarization at 25° C. is 42 nC/cm², and the critical pulse area in the chevron geometry is 500 Vs/m. In multiplex operation the mixture switches with a 79% margin, has an effective switching angle $2\theta_{eff}$ of 25° and has a contrast ratio of 29:1.

In a further experiment, a quasi-bookshelf geometry is produced at 60 ° C. by applying a square wave voltage (15 V/μm, 10 Hz). At 25° C. the critical pulse area (CPA) of the mixture in the cell thus pretreated is 700 Vs/m, the effective switching angle $2\theta_{eff}$ is 40°, and the contrast ratio in multiplex operation is 30:1 at a margin of 70%.

Example 2

| a mixture consisting of: | proportion by weight |
|---|---|
| $C_7H_{15}$—O—[pyrimidine]—[phenyl]—O—$C_9H_{19}$ | 5.68% |
| $C_6H_{13}$—O—[pyrimidine]—[phenyl]—O—$C_8H_{17}$ | 6.41% |
| $C_8H_{17}$—[pyrimidine]—[phenyl]—O—$C_{10}H_{21}$ | 6.20% |
| $C_6H_{13}$—O—[pyrimidine]—[phenyl]—O—$C_6H_{13}$ | 4.46% |
| $C_8H_{17}$—O—[pyrimidine]—[phenyl]—O—$C_6H_{13}$ | 6.41% |
| $C_{10}H_{21}$—O—[phenyl]—CO—O—[phenyl]—O—$(CH_2)_3$—CH(CH₃)(C₂H₅) | 7.81% |
| $C_6H_{13}$—O—[phenyl]—CO—O—[phenyl(CH₃)]—O—CO—[phenyl]—O—$C_6H_{13}$ | 2.22% |
| H—[cyclohexyl]—[phenyl]—CO—O—[pyrimidine]—[phenyl]—O—$C_8H_{17}$ | 5.06% |

-continued
| a mixture consisting of: | proportion by weight |
|---|---|
|  | 6.11% |
| 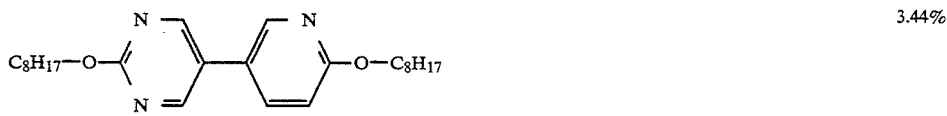 | 3.44% |
| 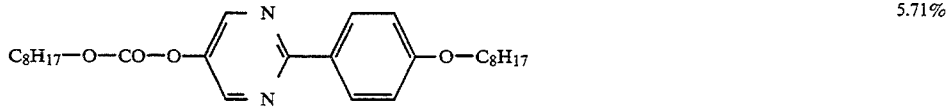 | 5.71% |
| 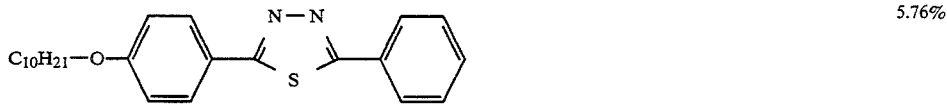 | 5.76% |
| 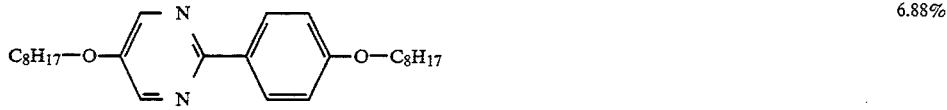 | 6.88% |
| 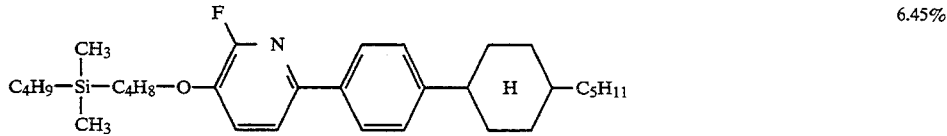 | 6.45% |
| 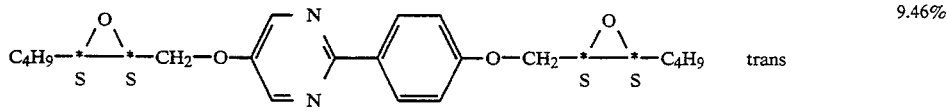 trans | 9.46% |
| 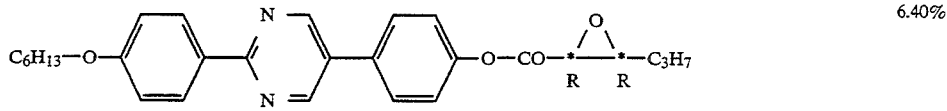 | 6.40% |
| 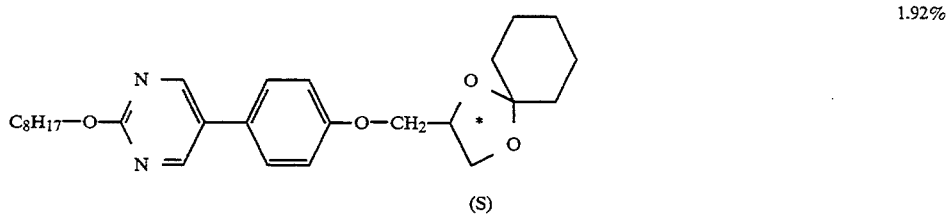 | 1.92% |
| 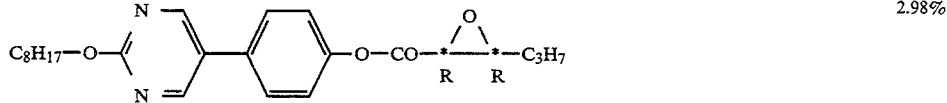 | 2.98% |

| a mixture consisting of: | proportion by weight |
|---|---|
| 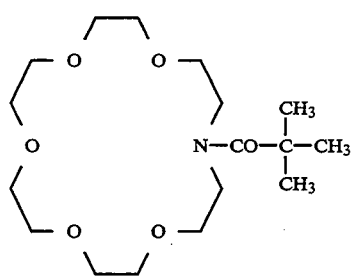 | 0.64% | exhibits the following liquid-crystalline phase ranges:

X −36 S$_C$* 73 S$_A$ 85 N* 92 I

The spontaneous polarization at 25° C. is 88.5 nC/cm$^2$, and the critical pulse area (CPA) in the chevron geometry is 380 Vs/m. The mixture switches in multiplex operation with a 36% margin, possesses an effective switching angle $2\theta_{eff}$ of 28° and has a contrast ratio of 25:1.

Example 3

| a mixture consisting of: | proportion by weight |
|---|---|
| C$_7$H$_{15}$—O—[pyrazine]—[phenyl]—O—C$_9$H$_{19}$ | 5.91% |
| C$_6$H$_{13}$—O—[pyrazine]—[phenyl]—O—C$_8$H$_{17}$ | 6.67% |
| C$_8$H$_{17}$—[pyrazine]—[phenyl]—O—C$_{10}$H$_{21}$ | 6.43% |
| C$_6$H$_{13}$—O—[pyrazine]—[phenyl]—O—C$_6$H$_{13}$ | 4.60% |
| C$_8$H$_{17}$—O—[pyrazine]—[phenyl]—O—C$_6$H$_{13}$ | 6.67% |
| C$_{10}$H$_{21}$—O—[phenyl]—CO—O—[phenyl]—O—(CH$_2$)$_3$—CH(CH$_3$)(C$_2$H$_5$) | 8.84% |
| C$_6$H$_{13}$—O—[phenyl]—CO—O—[phenyl(CH$_3$)]—O—CO—[phenyl]—O—C$_6$H$_{13}$ | 2.34% |
| H—[cyclohexyl]—[phenyl]—CO—O—[pyrazine]—[phenyl]—O—C$_8$H$_{17}$ | 5.38% |

-continued

| a mixture consisting of: | proportion by weight |
|---|---|
| $C_3H_7-O-$ [phenyl]-[pyrimidine(N,N)]-[phenyl]$-O-C_8H_{17}$ | 6.49% |
| $C_8H_{17}-O-$[pyrimidine(N,N)]-[pyridine(N)]$-O-C_8H_{17}$ | 3.67% |
| $C_8H_{17}-O-CO-O-$[pyrimidine(N,N)]-[phenyl]$-O-C_8H_{17}$ | 7.09% |
| $C_{10}H_{21}-O-$[phenyl]-[thiadiazole(N-N,S)]-[phenyl] | 6.12% |
| $C_8H_{17}-O-$[pyrimidine(N,N)]-[phenyl]$-O-C_8H_{17}$ | 7.15% |
| $C_4H_9-\underset{\underset{CH_3}{\mid}}{\overset{\overset{CH_3}{\mid}}{Si}}-C_4H_8-O-$[pyridine(2-F,N)]-[phenyl]-[H cyclohexyl]$-C_5H_{11}$ | 6.79% |
| $C_4H_9-*\underset{S}{\overset{O}{\triangle}}*-CH_2-O-$[pyrimidine(N,N)]$-O-CH_2-*\underset{S}{\overset{O}{\triangle}}*-C_4H_9$   trans | 6.80% |
| $C_6H_{13}-O-$[phenyl]-[pyrimidine(N,N)]-[phenyl]$-O-CO-*\overset{O}{\triangle}*-C_3H_7$  R R | 4.71% |
| $C_8H_{17}-O-$[pyrimidine(N,N)]-[phenyl]$-O-CO-*\overset{O}{\triangle}*-C_3H_7$  R R | 2.15% |
| $C_8H_{17}-O-$[pyrimidine(N,N)]-[phenyl]$-O-CO-CH*-\underset{O}{\overset{O}{\diamond}}\underset{CH_3}{\overset{CH_3}{<}}$ (S) | 1.48% |

| a mixture consisting of: | proportion by weight |
|---|---|
| 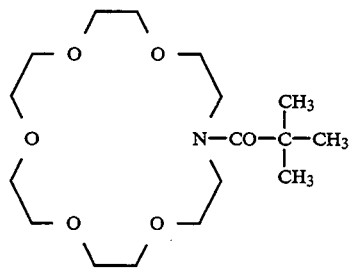 | 0.70% | exhibits the following liquid-crystalline phase ranges:

X−35 S$_c$* 70 S$_A$ 85 N* 91 I

The spontaneous polarization at 25° C. is 50 nC/cm², and the critical pulse area in the chevron geometry is 470 Vs/m. The mixture switches in multiplex operation with a 44% margin, possesses an effective switching angle 2$\theta_{eff}$ of 27° and has a contrast ratio of 18:1.

Example 4

| a mixture consisting of: | proportion by weight |
|---|---|
| C$_7$H$_{15}$—O—[pyrimidine]—[phenyl]—O—C$_9$H$_{19}$ | 3.85% |
| C$_6$H$_{13}$—O—[pyrimidine]—[phenyl]—O—C$_8$H$_{17}$ | 4.34% |
| C$_8$H$_{17}$—[pyrimidine]—[phenyl]—O—C$_{10}$H$_{21}$ | 4.8% |
| C$_6$H$_{13}$—O—[pyrimidine]—[phenyl]—O—C$_6$H$_{13}$ | 4.03% |
| C$_8$H$_{17}$—O—[pyrimidine]—[phenyl]—O—C$_6$H$_{13}$ | 4.34% |
| C$_{10}$H$_{21}$—O—[phenyl]—CO—O—[phenyl]—O—(CH$_2$)$_3$—CH(CH$_3$)(C$_2$H$_5$) | 8.28% |
| C$_6$H$_{13}$—O—[phenyl]—CO—O—[methylphenyl]—O—CO—[phenyl]—O—C$_6$H$_{13}$ | 2.35% |
| [cyclohexyl]—[phenyl]—CO—O—[pyrimidine]—[phenyl]—O—C$_8$H$_{17}$ | 3.29% |

-continued

| a mixture consisting of: | proportion by weight |
|---|---|
| C₃H₇—O—[phenyl]—[pyrimidine(N,N)]—[phenyl]—O—C₈H₁₇ | 6.50% |
| C₈H₁₇—O—[pyrimidine]—[pyridine]—O—C₈H₁₇ | 3.69% |
| C₈H₁₇—O—CO—O—[pyrimidine]—[phenyl]—O—C₈H₁₇ | 8.13% |
| C₁₀H₂₁—O—[phenyl]—[thiadiazole(N-N,S)]—[phenyl] | 6.05% |
| C₈H₁₇—O—[pyrimidine]—[phenyl]—O—C₈H₁₇ | 4.66% |
| C₈H₁₇—O—[phenyl]—[fluoropyridine]—[phenyl]—O—C₄H₈—Si(CH₃)₂—C₄H₉ | 7.49% |
| C₈H₁₇—O—[phenyl]—[phenyl]—O—CO—[phenyl]—O—C₄H₈—Si(CH₃)₂—C₄H₉ | 8.23% |
| C₈H₁₇—O—[pyrimidine]—[phenyl]—O—CO—O—C₆H₁₃ | 7.63% |
| C₄H₉—*(S)—*(S)—[epoxide-O]—CH₂—O—[pyrimidine]—[phenyl]—O—CH₂—*(S)—*(S)—[epoxide-O]—C₄H₉   trans | 2.79% |
| C₆H₁₃—O—[phenyl]—[pyrimidine]—[phenyl]—O—CO—*(R)—*(R)—[epoxide-O]—C₃H₇ | 6.85% |
| C₈H₁₇—O—[pyrimidine]—[phenyl]—O—CH₂—*—[dioxolane-cyclohexyl] (S) | 2.05% |

| a mixture consisting of: | proportion by weight |
|---|---|
| 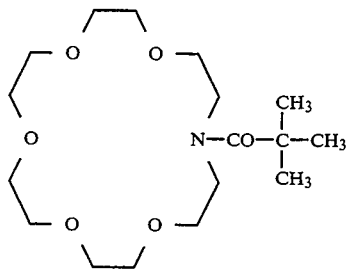 | 0.67% | exhibits the following liquid-crystalline phase ranges:

X—39 $S_c^*$ 76 $S_A$ 85 N* 94 I

The spontaneous polarization at 25° C. is 45 nC/cm², and the critical pulse area in the chevron geometry is 520 Vs/mo The mixture switches in multiplex operation with a 70% margin, possesses an effective switching angle $2\theta_{eff}$ of 28.5° and has a contrast ratio of 25:1.

Example 5

| a mixture consisting of: | proportion by weight |
|---|---|
| $C_7H_{15}$—O—[pyrimidine]—[phenyl]—O—$C_9H_{19}$ | 4.26% |
| $C_6H_{13}$—O—[pyrimidine]—[phenyl]—O—$C_8H_{17}$ | 4.81% |
| $C_8H_{17}$—[pyrimidine]—[phenyl]—O—$C_{10}H_{21}$ | 5.31% |
| $C_6H_{13}$—O—[pyrimidine]—[phenyl]—O—$C_6H_{13}$ | 4.46% |
| $C_8H_{17}$—O—[pyrimidine]—[phenyl]—O—$C_6H_{13}$ | 4.81% |
| $C_{10}H_{21}$—O—[phenyl]—CO—O—[phenyl]—O—$(CH_2)_3$—CH(CH$_3$)(C$_2$H$_5$) | 7.45% |
| $C_3H_7$—O—[phenyl]—[pyrimidine]—[phenyl]—O—$C_8H_{17}$ | 6.06% |
| $C_8H_{17}$—O—[pyrimidine]—[pyridine]—O—$C_8H_{17}$ | 3.72% |

-continued

| a mixture consisting of: | proportion by weight |
|---|---|
| C₈H₁₇—O—CO—O—[pyrimidine]—[phenyl]—O—C₈H₁₇ | 7.47% |
| C₁₀H₂₁—O—[phenyl]—[thiadiazole]—[phenyl] | 6.10% |
| C₈H₁₇—O—[pyrimidine]—[phenyl]—O—C₈H₁₇ | 5.16% |
| C₈H₁₇—O—[phenyl]—[fluoropyridine]—[phenyl]—O—C₄H₈—Si(CH₃)₂—C₄H₉ | 7.53% |
| C₈H₁₇—O—[phenyl]—[phenyl]—O—CO—[phenyl]—O—C₄H₈—Si(CH₃)₂—C₄H₉ | 8.30% |
| C₈H₁₇—O—[pyrimidine]—[phenyl]—O—CO—O—C₆H₁₃ | 6.82% |
| C₄H₉—*[dithiolane]*—CH₂—O—[pyrimidine]—[phenyl]—O—CH₂—*[dithiolane]*—C₄H₉  trans | 2.82% |
| C₆H₁₃—O—[phenyl]—[pyrazine]—[phenyl]—O—CO—*[oxirane]*—C₃H₇  R,R | 5.24% |
| C₈H₁₇—O—[pyrimidine]—[phenyl]—O—CH₂—*[cyclohexane-dioxolane]*  (S) | 2.06% |
| C₈H₁₇—O—[pyrimidine]—[phenyl]—O—CO—*[oxirane]*—C₃H₇  R,R | 1.50% |
| C₄H₉—*[dithiolane]*—CH₂—O—[pyrimidine]—[phenyl]—O—CO—[cyclohexane]—C₅H₁₁  trans | 5.46% |

| a mixture consisting of: | proportion by weight |
|---|---|
| 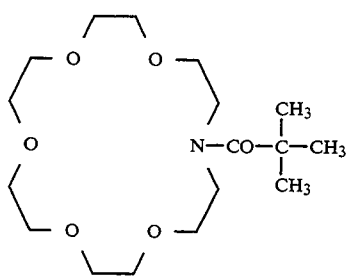 | 0.64% | exhibits the following liquid-crystalline phase ranges:

X−37 S$_c$* 80 S$_A$ 88 N* 95 I

The spontaneous polarization at 25° C. is 57 nC/cm$^2$, and the critical pulse area in the chevron geometry is 415 Vs/m. The mixture switches in multiplex operation with a 47% margin, possesses an effective switching angle 2θ$_{eff}$ of 27° and has a contrast ratio of 18:1.

Example 6

| A mixture consisting of: | proportion by weight |
|---|---|
| C$_8$H$_{17}$—O—[pyrimidine]—[pyrimidine]—O—C$_8$H$_{17}$ | 3.44 |
| C$_6$H$_{13}$—O—[pyrimidine]—[phenyl]—O—C$_6$H$_{13}$ | 3.01 |
| H—[cyclohexyl]—[phenyl]—CO—O—[pyrimidine]—[phenyl]—O—C$_8$H$_{17}$ | 5.04 |
| C$_7$H$_{15}$—O—[pyrimidine]—[phenyl]—O—C$_9$H$_{19}$ | 5.54 |
| C$_8$H$_{17}$—O—CO—O—[pyrimidine]—[phenyl]—O—C$_8$H$_{17}$ | 6.69 |
| C$_{10}$H$_{21}$—O—[phenyl]—[thiadiazole]—[phenyl] | 5.74 |
| C$_3$H$_7$—O—[phenyl]—[pyrimidine]—[phenyl]—O—C$_8$H$_{17}$ | 7.09 |
| C$_6$H$_{13}$—O—[pyrimidine]—[phenyl]—O—C$_8$H$_{17}$ | 5.70 |

| A mixture consisting of: | proportion by weight |
|---|---|
| 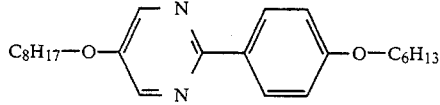 | 6.25 |
| 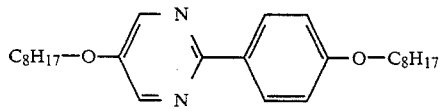 | 6.72 |
| 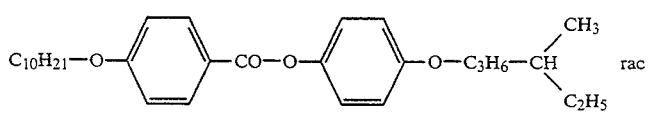 rac | 7.79 |
| 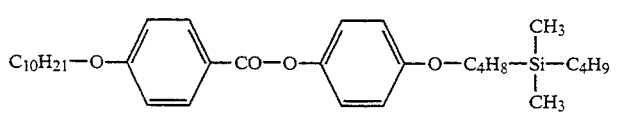 | 4.57 |
| 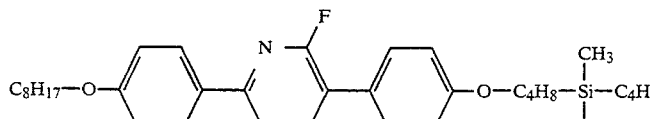 | 7.02 |
| 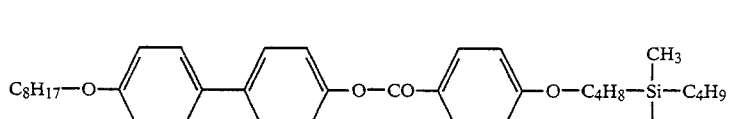 | 4.98 |
| 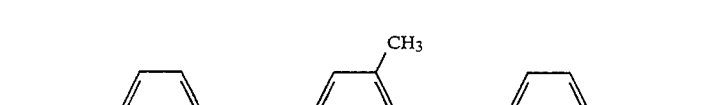 | 2.21 |
| 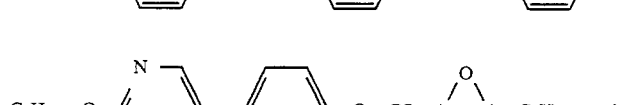 cis | 3,45 |
| 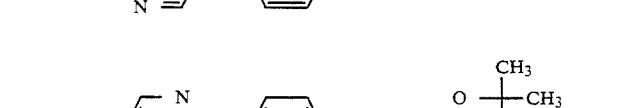 | 3,35 |
|  trans | 6.98 |
| 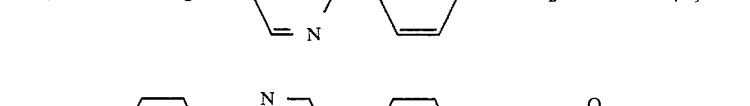 cis | 3.65 |

| A mixture consisting of: | proportion by weight |
|---|---|
|  | 0.78 | exhibits the following liquid-crystalline phase ranges:

X—33 $S_c^*$ 73 $S_A$ 84 N* 93 I

The spontaneous polarization at 25° C. is 62 nC/cm², and the critical pulse area in the chevron geometry is 480 Vs/m. The mixture switches in multiplex operation with a 53% margin, possesses an effective switching angle $2\theta_{eff}$ of 29° and has a contrast ratio of 26:1.

Example 7

| A mixture consisting of: | proportion by weight |
|---|---|
| $C_8H_{17}$—O—[pyrimidine]—[pyridine]—O—$C_8H_{17}$ | 3.43 |
| $C_6H_{13}$—O—[pyrimidine]—[phenyl]—O—$C_6H_{13}$ | 3.01 |
| [cyclohexyl]—[phenyl]—CO—O—[pyrimidine]—[phenyl]—O—$C_8H_{17}$ | 5.04 |
| $C_7H_{15}$—O—[pyrimidine]—[phenyl]—O—$C_9H_{19}$ | 5.53 |
| $C_8H_{17}$—O—CO—O—[pyrimidine]—[phenyl]—O—$C_8H_{17}$ | 6.64 |
| $C_{10}H_{21}$—O—[phenyl]—[thiadiazole]—[phenyl] | 5.74 |
| $C_3H_7$—O—[phenyl]—[pyrimidine]—[phenyl]—O—$C_8H_{17}$ | 7.07 |
| $C_6H_{13}$—O—[pyrimidine]—[phenyl]—O—$C_8H_{17}$ | 5.69 |

-continued
| A mixture consisting of: | proportion by weight |
|---|---|
| 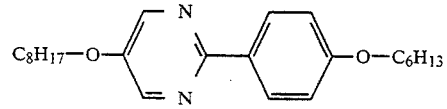 | 6.24 |
| 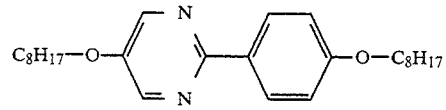 | 6.70 |
| 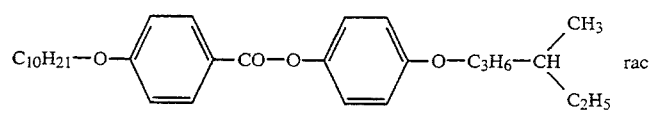 rac | 7.77 |
| 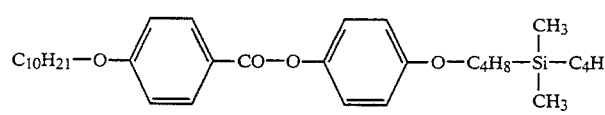 | 4.56 |
| 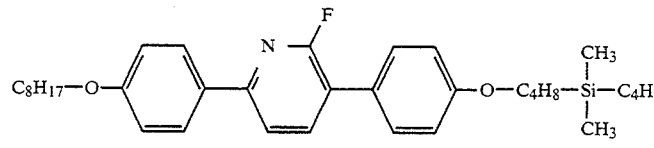 | 7.01 |
| 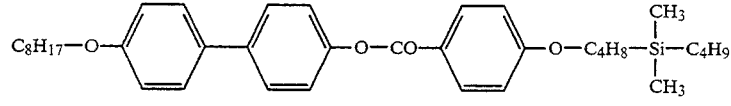 | 4.97 |
| 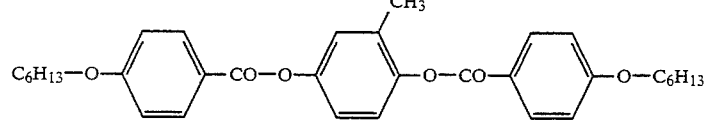 | 2.21 |
| 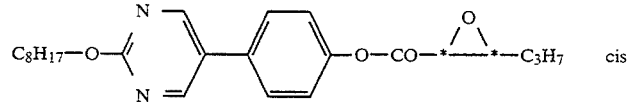 cis | 3.80 |
| 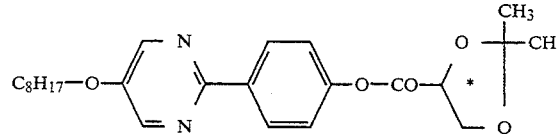 | 4.93 |
| 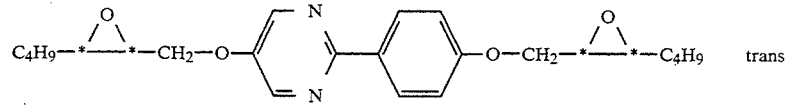 trans | 4.74 |
| 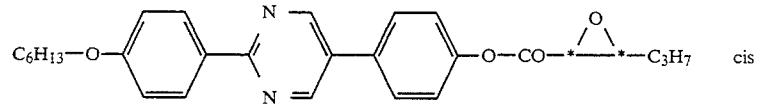 cis | 4.24 |

| A mixture consisting of: | proportion by weight |
|---|---|
| 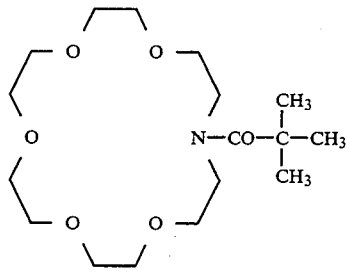 | 0,68 | exhibits the following liquid-crystalline phase ranges:

X −30 $S_c^*$ 73 $S_A$ 85 N* 90.5 I

The spontaneous polarization at 25° C. is 63.5 nC/cm$^2$, and the critical pulse area in the chevron geometry is 465 Vs/m. The mixture switches in multiplex operation with a 50% margin, possesses an effective switching angle 2$\theta_{eff}$ of 28° and has a contrast ratio of 31:1.

The examples indicate that the mixtures according to the invention are particularly suitable for use in electro-optical switching and display media.

We claim:
1. A smectic liquid-crystal mixture comprising:
A. at least one compound of the formula (I)

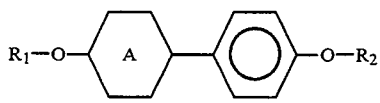 (I)

in which:
R$_1$ and R$_2$ are identical or different and are a straight-chain or branched alkyl group having 1 to 18 or 3 to 18 carbon atoms respectively, where a —CH$_2$— group adjacent to the oxygen can also be replaced by —CO,

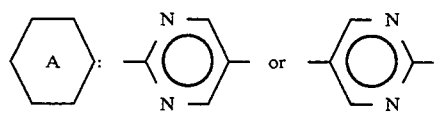

and/or at least one compound of the formula (II)

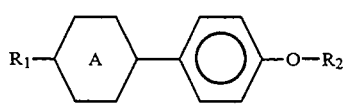 (II)

in which:
R$_1$ and R$_2$ are identical or different and are a branched or unbranched alkyl group having 1 to 18 or 3 to 18 carbon atoms respectively, where a —CH$_2$— group adjacent to the oxygen can also be replaced by —CO—;

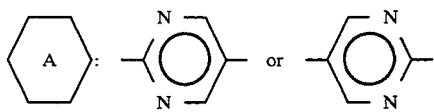

B. at least one compound of the formula (III)

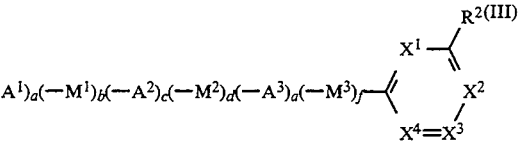 (III)

in which:
R$^1$ and R$^2$ are identical or different and are a straight-chain or branched alkyl radical having 1 to 22 or 3 to 22 carbon atoms respectively, where one or two nonadjacent —CH$_2$— groups can also be replaced by —O—, —CO—, —CO—O—, —O—CO—, —O—CO—O— or —Si(CH$_3$)$_2$—, A$^1$, A$^2$ and A$^3$ are identical or different and are 1,4-phenylene, where one or two H atoms may be replaced by F, 2,5-pyridinediyl, where one or two H atoms can be replaced by F, 2,5-pyrimidinediyl, where one or two H atoms can be replaced by F, trans-1,4-cyclohexylene, where one or two H atoms can be replaced by —CN and/or —CH$_3$, or 1,3,4-thiadiazole-2,5-diyl, and A$^1$ is

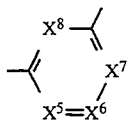

M$^1$, M$^2$ and M$^3$ are identical or different and are —O—, —CO—O—, —O—CO—, —CH$_2$—O—, —O—CH$_2$—, —CH$_2$—CH$_2$—, X$^1$, X$^2$, X$^3$, X$^4$, X$^5$, X$^6$, X$^7$ and X$^8$ are CH or N, the number of N atoms per six-membered ring being 0, 1 or 2, a, b, c, d, e and f are zero or one, on condition that the sum of a+c+e is 0, 1, 2 or 3;

C. at least one compound of the formula (IV)

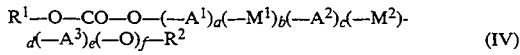 (IV)

in which:

$R^1$ and $R^2$ are identical or different and are a straight-chain or branched alkyl group having 1 to 22 or 3 to 22 carbon atoms respectively, $A^1$, $A^2$ and $A^3$ are identical or different and are 1,4-phenylene, where one or two H atoms can also be replaced by F, 2,5-pyrimidinediyl, where one or two H atoms can also be replaced by F, or 2,5-pyridinediyl, where one or two H atoms can also be replaced by F, $M^1$ and $M^2$ are identical or different and are —O—, —CO—, —CO—O—, —O—CO—, —CH$_2$—O—, —O—CH$_2$— or —CH$_2$—CH$_2$—, a, b, c, d, e and f are zero or one, on condition that the sum a+c+e is 1, 2 or 3;

and at least one compound from groups D to H;

D. silicon compounds of the formula (V)

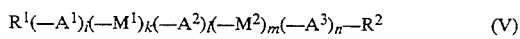

(V)

in which:

$R^1$ is straight-chain or branched alkyl having 1 to 22 or 3 to 22 carbon atoms respectively, where one or two nonadjacent —CH$_2$— groups can also be replaced by —O—, —CO—, —CO—O—, —O—CO— or —O—CO—O—, $R^2$ is straight-chain or branched alkyl having 1 to 22 or 3 to 22 carbon atoms respectively, where one or two nonadjacent —CH$_2$— groups can also be replaced by —O—, —CO—, —CO—O—, —O—CO— or —O—CO—O—, with the proviso that one —CH$_2$— group not attached to oxygen is replaced by —Si(CH$_3$)$_2$—, $A^1$, $A^2$ and $A^3$ are identical or different and are 1,4-phenylene, where one or two H atoms can be replaced by F, trans-1,4-cyclohexylene, 2,5-pyridinediyl, where one or two H atoms can be replaced by F, 2,5-pyrimidinediyl, where one or two H atoms can be replaced by F, or 1,3,4-thiadiazole-2,5-diyl, $M^1$ and $M^2$ are identical or different and are —CO—O—, —O—CO—, —CH$_2$—O— or —O—CH$_2$—, i, k, l, m and n are zero or one, with the proviso that i+l+n=2 or 3;

E. hydroquinone derivatives of the formula (VI)

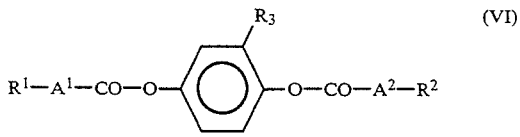

(VI)

in which:

$R^1$ and $R^2$ are identical or different and are a straight-chain or branched alkyl radical having 1 or 3 to 16, preferably 1 or 3 to 10, carbon atoms, respectively, where one or two nonadjacent —CH$_2$— groups can also be replaced by —O—, —CO—, —O—CO—, —CO—O— or —O—CO—O—, $R^3$ is —CH$_3$, —CF$_3$ or —C$_2$H$_5$, $A^1$ and $A^2$ are identical or different and are

F. pyridylpyrimidines of the formula (VII)

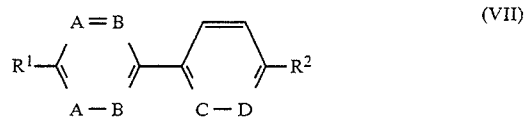

(VII)

in which:

A is N and B is CH or A is CH and B is N, C is N and D is CH or C is CH and D is N, where one or two CH groups can be replaced by CF groups, $R^1$ and $R^2$ are identical or different and are a straight-chain or branched alkyl radical having 1 to 22 or 3 to 22 carbon atoms respectively, where one or two nonadjacent —CH$_2$— groups can also be replaced by —O—, —CO—, —CO—O—, —O—CO— or —O—CO—O—;

G. phenylbenzoates of the formula (VIII)

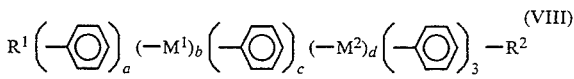

(VIII)

in which:

$R^1$ and $R^2$ are identical or different and are a straight-chain or branched alkyl radical having 1 to 22 or 3 to 22 carbon atoms respectively, where one or two nonadjacent —CH$_2$— groups can also be replaced by —O—, —CO— or —CO—O—, —O—CO— or —O—CO—O—, $M^1$ and $M^2$ are identical or different and are —CO—O—, —O—CO—, a, b, c, d and e are zero or one, on condition that a+c+e=2 or 3 and b+d=1 or 2; and H. compounds of the formula (IX)

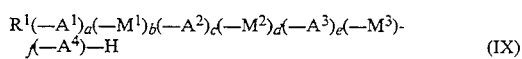

(IX)

in which:

$R^1$ is a straight-chain or branched alkyl radical having 1 to 22 or 3 to 22 carbon atoms respectively, where one or two nonadjacent —CH$_2$ groups can also be replaced by —O—, —CO—, —CO—O—, —O—CO—, —O—CO—O— or —Si(CH$_3$)$_2$—, $A^1$, $A^2$, $A^3$ and $A^4$ are identical or different and are 1,4-phenylene, where one or two H atoms can be replaced by F or CN, 2,5-pyridinediyl, where one or two H atoms can be replaced by F, 2,5-pyrimidinediyl, where one or two H atoms can be replaced by F, trans-1,4-cyclohexylene, 1,3,4-thiadiazole-2,5-diyl or 2,6-naphthalenediyl, $M^1$, $M^2$ and $M^3$ are identical or different and are —CO—O—, —O—CO—, —CH$_2$—O—, —O—CH$_2$— or —CH$_2$—CH$_2$—, a, b, c, d, e and f are zero or one, on condition that the sum a+c+e is 0, 1, 2 or 3.

2. A smectic liquid-crystal mixture as claimed in claim 1, wherein component A comprises compounds of the formula (I) and/or (II) in which:

$R^1$ and $R^2$ are identical or different and are a straight-chain or branched alkyl group having 1 to 12 or 3 to 12 carbon atoms respectively, where a —CH$_2$— group adjacent to the oxygen can also be replaced by —CO—, $$\langle A \rangle: \quad -\langle\bigcirc\rangle- \quad -\langle\overset{N}{\underset{N}{\bigcirc}}\rangle-$$

component B comprises compounds of the formula (III) in which:

- $R^1$ and $R^2$ are identical or different and are a straight-chain alkyl radical having 1 to 14 carbon atoms, where one or two nonadjacent —$CH_2$ groups can also be replaced by —O—, —CO—, —CO—O—, —O—CO—, —O—CO—O— or —Si($CH_3$)$_2$—,
- $A^1$, $A^2$ and $A^3$ are identical or different and are 1,4-phenylene, 2,5-pyrimidinediyl, where one or two H atoms can also be replaced by F, trans-1,4-cyclohexylene or 1,3,4-thiadiazole-2,5-diyl;

and component C comprises compounds of the formula (IV) in which:

- $R^1$ and $R^2$ are identical or different and are a straight-chain alkyl radical having 1 to 14 carbon atoms, where one or two nonadjacent —$CH_2$ groups can also be replaced by —O—, —CO—, —CO—O—, —O—CO—, —O—CO—O— or —Si($CH_3$)$_2$—,
- $A^1$, $A^2$ and $A^3$ are identical or different and are 1,4-phenylene, 2,5-pyrimidinediyl, where one or two H atoms can also be replaced by F, trans-1,4-cyclohexylene or 1,3,4-thiadiazole-2,5-diyl.

3. A smectic liquid-crystal mixture as claimed in claim 1, wherein components A to H are present in the following quantities (in % by weight, based on the overall mixture):

A: From 20 to 50%,
B: From 5 to 10%,
C: From 5 to 15%,
D: From 5 to 20%,
E: From 2 to 5%,
F: From 2 to 5%,
G: From 2 to 20%,
H: From 5 to 20%.

4. A smectic liquid-crystal mixture as claimed in claim 1, which is ferroelectric and which comprises at least one compound from each of groups A, B and C, at least one compound from groups D to H, at least one compound from group N: macrocyclic compounds of the formula (XV)

$$(XV)$$

where
n is 0 or 1 and
Y is —CO—(t-butyl) or —CO—(adamantyl)
and at least two compounds from groups I to M:

I. optically active phenylbenzoates of the formula (X)

$$R^1\left(-\langle\bigcirc\rangle-\right)_a(-M^1)_b\left(-\langle\bigcirc\rangle-\right)_c(-M^2)_d\left(-\langle\bigcirc\rangle-\right)_e-R^2 \quad (X)$$

in which:

- $R^1$ and $R^2$ are identical or different and are a straight-chain or branched alkyl radical having 1 to 22 or 3 to 22 carbon atoms respectively, where one or two nonadjacent —$CH_2$— groups can also be replaced by —O—, —CO—, —CO—O—, —O—CO— or —O—CO—O—, and in which at least one of the radicals $R^1$ and $R^2$ is a branched, optically active alkyl group,
- $M^1$ and $M^2$ are identical or different and are —CO—O—, —O—CO— or a single bond,
- a, b, c, d and e are zero or one, on condition that the sum of a+c+e is 2 or 3 and b+d is 1 or 2;

J. optically active oxirane ethers of the formula (XI)

$$R^1(-A^1)_a(-M^1)_b(-A^2)_c(-M^2)_d(-A^3)_e O-CH_2-\underset{R^2}{C^*}-\underset{R^3}{\overset{O}{\overset{/\backslash}{C^*}}}-R^4 \quad (XI)$$

in which the symbols and indices have the following meanings:

* is a center of chirality,
- $R^1$ is a straight-chain or branched alkyl radical having 1 to 22 or 3 to 22 carbon atoms respectively, where one or two non-adjacent —$CH_2$— groups can also be replaced by —O—, —CO—, —CO—O—, —O—CO—, —O—CO—O— or —Si($CH_3$)$_2$—, or the optically active group below, $$\overset{R^6}{\underset{R^7}{\rangle}}\overset{*}{\diagdown}\overset{O}{\diagup}\overset{*}{\diagdown}\underset{R^5}{P}-O-$$

- $R^2$, $R^3$, $R^4$, $R^5$, $R^6$ and $R^7$ are identical or different and are H or a straight-chain or branched alkyl radical having 1 to 16 or 3 to 16 carbon atoms respectively,
- P is —$CH_2$— or —CO—,
- $A^1$, $A^2$ and $A^3$ are identical or different and are 1,4-phenylene, where one or two H atoms can be replaced by F, 2,5-pyridinediyl, where one or two H atoms can be replaced by F, 2,5-pyrimidinediyl, where one or two H atoms can be replaced by F, trans-1,4-cyclohexylene, where one or two H atoms can be replaced by —CN and/or —$CH_3$, or 1,3,4-thiadiazole-2,5-diyl,
- $M^1$ and $M^2$ are identical or different and are —CO—O—, —O—CO—, —$CH_2$—O—, —O—$CH_2$— or —$CH_2$—$CH_2$—,
- e is 1,
- a, b, c and d are zero or one;

K. optically active oxirane esters of the formula (XII)

$$R^1(-A^1)_a(-M^1)_b(-A^2)_c(-M^2)_d(-A^3)_e O-CO-\underset{R^2}{C^*}-\underset{R^3}{\overset{O}{\overset{/\backslash}{C^*}}} \quad (XII)$$

in which the symbols and indices have the following meanings:

* is a center of chirality, $R^1$ is a straight-chain or branched alkyl radical having 1 to 22 or 3 to 22 carbon atoms respectively, where one or two non-adjacent —$CH_2$— groups can also be replaced by —O—, —CO—, —CO—O—, —O—CO—, —O—CO—O— or —$Si(CH_3)_2$—, $R^2$, $R^3$ and $R^4$ are identical or different and are H or a straight-chain or branched alkyl radical having 1 to 16 carbon atoms, $A^1$, $A^2$ and $A^3$ are identical or different and are 1,4-phenylene, where one or two H atoms can be replaced by F, 2,5-pyridinediyl, where one or two H atoms may be replaced by F, 2,5-pyrimidinediyl, where one or two H atoms can be replaced by F, trans-1,4-cyclohexylene, in which one or two H atoms can be replaced by —CN and/or —$CH_3$, or 1,3,4-thiadiazole-2,5-diyl, $M^1$ and $M^2$ are identical or different and are —CO—O—, —O—CO—, —$CH_2$—O—, —O—$CH_2$— or —$CH_2$—$CH_2$—, e is 1, a, b, c and d are zero or one;

L. optically active dioxane ethers of the formula (XIII)

$$R^1+A^1)_a(-M^1)_b(-A^2)_c(M^2)_d(-A^3)_e-O-CH_2-\overset{*}{\underset{R^4}{\diagdown}}\!\!\!\begin{array}{c}O\\[-2pt]\diagup\!\!\!\diagdown\!\!\!R_3^{R_2}\\O\end{array}\quad (XIII)$$

in which the symbols and indices have the following meanings:

* is a center of chirality, $R^1$ is a straight-chain or branched alkyl radical having 1 to 22 or 3 to 22 carbon atoms respectively, where one or two nonadjacent —$CH_2$— groups can also be replaced by —O—, —CO—, —CO—O—, —O—CO—, —O—CO—O— or —$Si(CH_3)_2$—, $R^2$, $R^3$ and $R^4$ are identical or different and are H or a straight-chain or branched alkyl radical having 1 to 16 carbon atoms, where $R^2$ and $R^3$ together can also be —$(CH_2)_5$—, $A^1$, $A^2$ and $A^3$ are identical or different and are 1,4-phenylene, where one or two H atoms can be replaced by F, 2,5-pyridinediyl, where one or two H atoms can be replaced by F, 2,5-pyrimidinediyl, where one or two H atoms can be replaced by F, trans-1,4-cyclohexylene, where one or two H atoms can be replaced by —CN and/or —$CH_3$, or 1,3,4-thiadiazole-2,5-diyl, $M^1$ and $M^2$ are identical or different and are —CO—O—, —O—CO—, —$CH_2$—O—, —O—$CH_2$— or —$CH_2$—$CH_2$—, e is 1, a, b, c and d are zero or one;

M. optically active dioxolane esters of the formula (XIV)

$$R^1+A^1)_a(-M^1)_b(-A^2)_c(M^2)_d(-A^3)_e-O-CO-\overset{*}{\underset{R^4}{\diagdown}}\!\!\!\begin{array}{c}O\\[-2pt]\diagup\!\!\!\diagdown\!\!\!R_3^{R_2}\\O\end{array}\quad (XIV)$$

in which:

$R^1$ is a straight-chain or branched alkyl radical having 1 to 16 carbon atoms, where one or more nonadjacent —$CH_2$— groups can be replaced by —O—, —CO—, —O—CO— or —CO—O—, $R^2$, $R^3$ and $R^4$ are identical or different and are H or a straight-chain alkyl radical having 1 to 16 carbon atoms, where $R^2$ and $R^3$ together can also be —$(CH_2)_5$—, $A^1$, $A^2$ and $A^3$ are identical or different and are 1,4-phenylene, where one or two H atoms can be replaced by F, 2,5-pyridinediyl, where one or two H atoms can be replaced by F, 2,5-pyrimidinediyl, where one or two H atoms can be replaced by F, trans-1,4-cyclohexylene, where one or two H atoms can be replaced by —CN and/or —$CH_3$, or 1,3,4-thiadiazole-2,5-diyl, $M^1$ and $M^2$ are identical or different and are —CO—O—, —O—CO—, —$CH_2$—O—, —O—$CH_2$— or —$CH_2$—$CH_2$—, e is 1, a, b, c and d are zero or one.

5. A ferroelectric, smectic liquid-crystal mixture as claimed in claim 4, which comprises at least three compounds from groups I to M.

6. A ferroelectric, smectic liquid-crystal mixture as claimed in claim 4, which comprises compounds from groups J, K, L and M.

7. A method of use for a ferroelectric, smectic liquid-crystal mixture as claimed claim 5 comprises filling it into an electro-optical switching and display device in which it is surrounded on both sides by layers which comprise at least one alignment layer, electrodes and limiting plates.

8. An electrooptical switching and display device, comprising a smectic liquid-crystal mixture as claimed in claim 1.

* * * * *